United States Patent
Shankar et al.

(10) Patent No.: US 6,885,801 B1
(45) Date of Patent: Apr. 26, 2005

(54) ENHANCEMENT OF FIBER BASED IMAGES

(75) Inventors: Subbakrishna Shankar, Shaker Heights, OH (US); David Rohler, University Heights, OH (US)

(73) Assignee: Clear Image Technology LLC, North Elyria, OH (US)

( * ) Notice: Subject to any disclaimer, the term of this patent is extended or adjusted under 35 U.S.C. 154(b) by 34 days.

(21) Appl. No.: 10/313,976

(22) Filed: Dec. 6, 2002

Related U.S. Application Data

(60) Provisional application No. 60/338,421, filed on Dec. 6, 2001.

(51) Int. Cl.[7] ................................................ G02B 6/06
(52) U.S. Cl. ...................................... 385/117; 385/116
(58) Field of Search .................................. 385/116–117

(56) References Cited

U.S. PATENT DOCUMENTS

| | | | | |
|---|---|---|---|---|
| 5,751,340 A | * | 5/1998 | Strobl et al. | .................. 348/65 |
| 5,822,486 A | * | 10/1998 | Svetkoff et al. | ............. 385/116 |
| 6,190,308 B1 | * | 2/2001 | Irion et al. | .................. 600/109 |
| 2003/0076571 A1 | * | 4/2003 | MacAulay et al. | ......... 359/237 |

* cited by examiner

*Primary Examiner*—Frank G. Font
*Assistant Examiner*—Eric Wong
(74) *Attorney, Agent, or Firm*—Fish & Richarson PC

(57) ABSTRACT

An image processing enhancement system for receiving a fiber based image. The characteristics of fiber bundle are used to image process an image which has come through the fiber bundle. Those characteristics may be obtained from individual calibration, or simply from a knowledge of the fiber bundle's likely characteristics. One aspect determines the positions of fiber pixels, and interpolates between those fiber pixels.

40 Claims, 8 Drawing Sheets

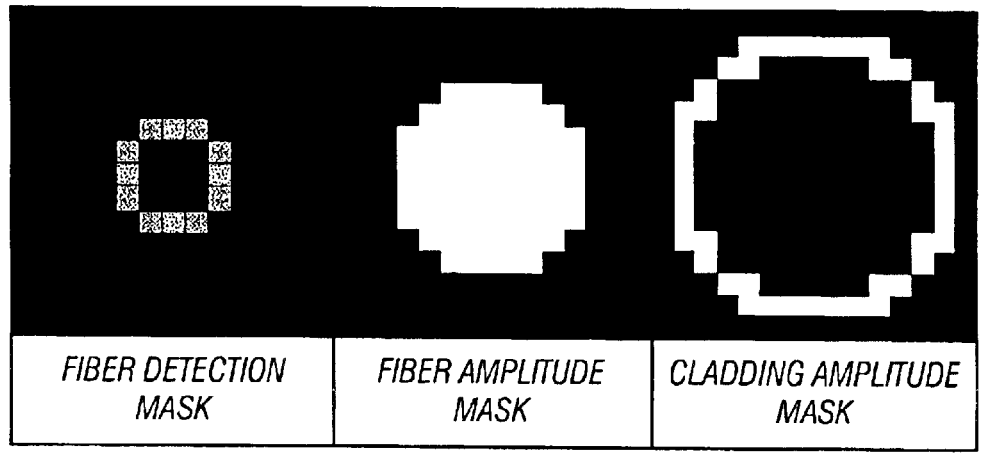
| FIBER DETECTION MASK | FIBER AMPLITUDE MASK | CLADDING AMPLITUDE MASK |
*FIG. 3A*     *FIG. 3B*     *FIG. 3C*
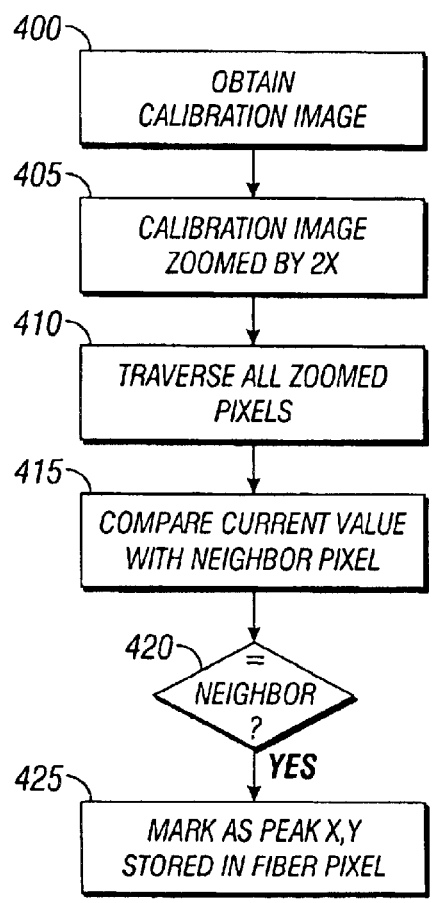
*FIG. 4*

SATURATION
REGION

FIBER VALUE
ONLY

CLADDING
VALUE ONLY

PEAK VALUE = 210

PEAK VALUE = 360
CAPPED AT 255

GAUSSIAN SHAPE
EXTRAPOLATED FROM
CAPPED FIBER PIXEL

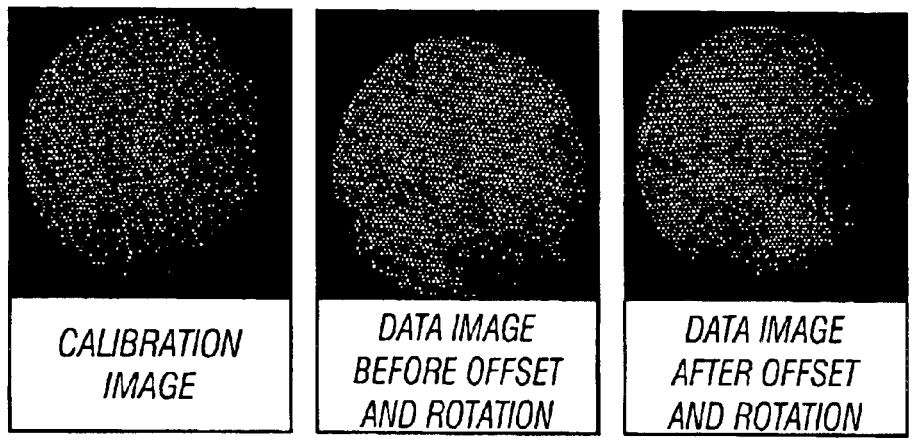
FIG. 9A — CALIBRATION IMAGE
FIG. 9B — DATA IMAGE BEFORE OFFSET AND ROTATION
FIG. 9C — DATA IMAGE AFTER OFFSET AND ROTATION
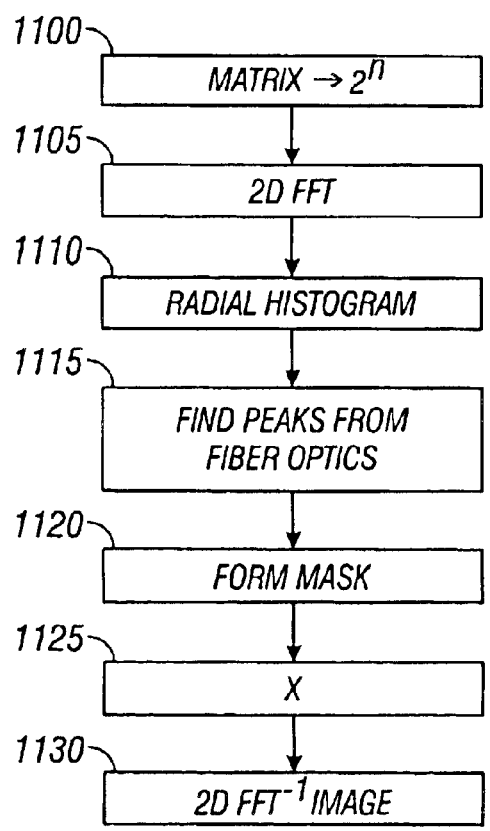
- 1100: MATRIX → $2^n$
- 1105: 2D FFT
- 1110: RADIAL HISTOGRAM
- 1115: FIND PEAKS FROM FIBER OPTICS
- 1120: FORM MASK
- 1125: X
- 1130: 2D $FFT^{-1}$ IMAGE
FIG. 11

OBJECT

IMAGE THROUGH FIBER BUNDLE

IMAGE THROUGH FIBER BUNDLE WITH FIBER BORDERS REMOVED

IMAGE

MASK IMAGE

ENHANCEMENT OF FIBER BASED IMAGES

This application claims priority to U.S. Provisional Application No. 60/338,421, filed Dec. 6, 2001.

BACKGROUND

Images may be obtained and coupled to a source over a fiber. One way in which this may be done, and in fact one of the preferred techniques of the present invention, does this in a fiber endoscope. Fiber endoscopes of this type may be used in a variety of clinical settings. Different size fiber endoscopes are known, with outer diameters of between 0.2 and 2 mm. The basic fiber endoscope can be of any desired length. High-quality endoscopes may have very little light loss.

Images obtained by these endoscopes, however, may be of limited quality. The limited quality of these images may make it difficult to accurately view tissue during the endoscopic procedure.

SUMMARY

The present invention teaches endoscope techniques and image enhancement techniques which are optimized for improving the usefulness of an image that is obtained through a fiber endoscope. These techniques may use a fiber space approach, in which the characteristics of the image are processed based on the characteristics of the fiber bundle that carries the image.

BRIEF DESCRIPTION OF THE DRAWINGS

These and other aspects will now be described in detail with reference to the accompanying drawings, wherein:

FIGS. 3A–3C shows a fiber detection mask, fiber amplitude mask and clad amplitude mask;

FIG. 4 shows a flowchart of obtaining the calibration image;

FIGS. 9a–9c show the calibration image and its rotation;

FIG. 11 shows a flowchart of radial histogram operations;

DETAILED DESCRIPTION

Figure 1:
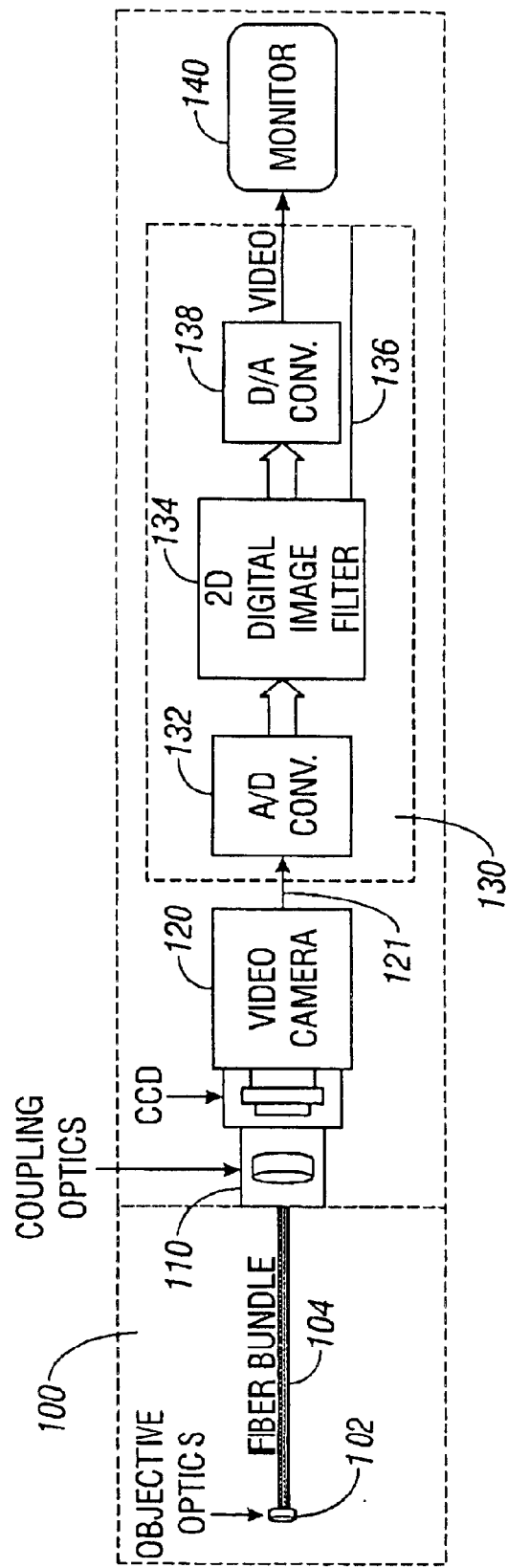
FIG. 1 shows a block diagram of the system.

FIG. 1 shows a basic block diagram of a fiber endoscope system including the endoscope, fiber, image processing, and monitoring. A fiber scope 100 is formed of an objective optic 102 that is adapted to be located in the area of interest. The objective optic 102 is coupled to a fiber bundle 104 which has an input and outlet end. Coupling optics 110 couples between the bundle and a video camera 120. The video camera 120 may typically be a CCD type video camera. An image processing module 130 is coupled to the output of the video camera to enhance the image. A/D converter 132 receives the video output from the camera and converts it to a digital image, e.g. one frame at a time. A two-dimensional digital image filter 134 may be used to process the frame, with much of the frame processing being carried out according to the description described herein. This produces an output shown as 136 which may be a digital output. A D/A converter 138 may also be used to produce conventional video output so that the image can be shown on monitor 140.

The image processing module carries out special operations on the signal to enhance the ability to discern information from the signal. The kinds of image processing operations that are carried out according to the present system basically fall into two different categories: artifact removal, and calibration-based image enhancement. If/when the calibration mode is used, then a calibration image is obtained to determine the locations of the fiber space. The non calibration operations effectively attempt to determine information about the image based on the knowledge of the geometry of the fibers and of the operations which are carried out on the fibers. In non calibration mode, the fiber space transform may be used to determine peaks, representing the brightest spot within a pixel. The magnitude of those peaks is estimated and the system interpolates between the peaks to remove the valleys which are caused by spaces between the fibers and fiber cores. This can be done using a two-dimensional convolution.

The artifact removal is effectively adjustment of the image based on known characteristics of images. In contrast, the calibration-based enhancement describes enhancing the image based on information about the specific characteristics of the specific fiber scope 100 that is being used.

One of the basic understandings of the present invention is that the different image acquiring operations each acquire their own individual frames of references, referred to herein as different "spaces". For example, the image is acquired by a fiber scope, which acquires the image in the fiber scope's frame of reference, referred to herein as "fiber space". Fiber space is collectively formed of the fibers of the endoscope: a collection of 2–4 µm cores which each receive the parts or "pixels" of light. The fiber space signal is then coupled to the camera which operates in "CCD space". Finally, the output signal is displayed on the display, which operates in its frame of reference, for example "display space". By processing the elements appropriately, the characteristics of each individual space may be taken into account. This may effectively improve the viewability of the image.

Figure 2:
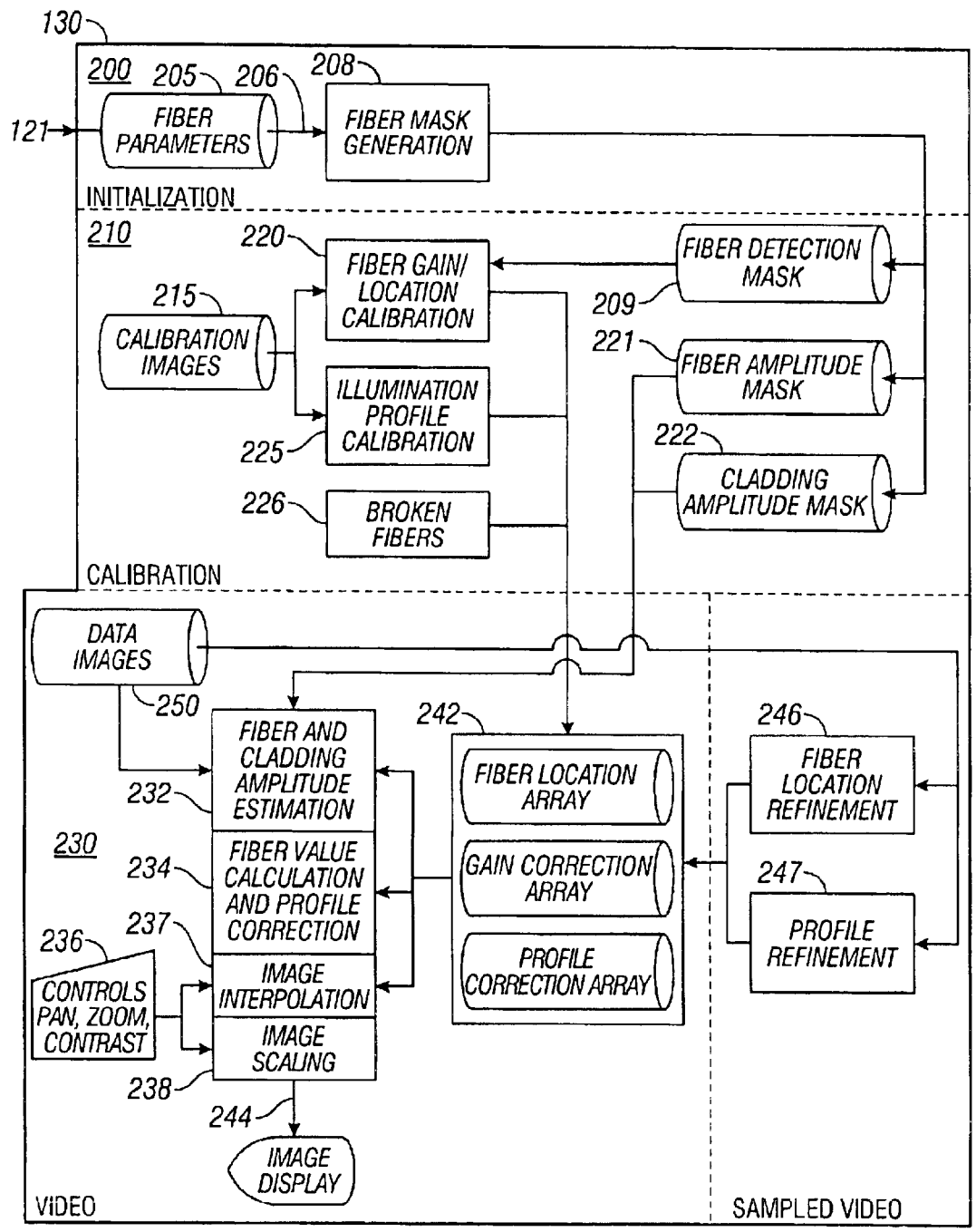
FIG. 2 shows a block diagram of an exemplary correction system.

FIG. 2 shows a basic block diagram of the system. The FIG. 2 block diagram shows an initialization 200 and a calibration 210. The camera output 121 in FIG. 1 is first input to a fiber parameter correlator shown as 205. Correlator 205 correlates the image from this individual fiber against stored templates representing characteristics of different known fibers. The output 206 of the correlator 205 is used by the fiber mask generation block 208 to determine a template. The fiber mask generation includes selecting a template from a lookup table with a number of different templates that illustrate what different single fibers might look like. For example, different manufacturers may have different fiber characteristics. Each of a number of the most common fibers may be stored in the fiber mask generation element. The fiber mask generation element 208 operates according to the fiber parameters to create a fiber mask shown as 209. This fiber mask 209 is then used in the calibration stage 210 in order to obtain an improved view of the fiber.

The calibration stage 210 may operate by acquiring a number of calibration images 215 using the individual scope. Each of these calibration images may be an image of known types. In an environment, the knowledge about the aspects of all endoscopes may be used even in a non calibrated system.

Fiber gain location calibration parameters are determined at block 220. This comprises obtaining the individual fiber characteristics. These characteristics may include the gain of each pixel and the location of each pixel. For example, this may be done by using a calibration image which is effectively all white of a known brightness. The received image then includes a pattern that indicates the gain of each fiber pixel, and the location of each fiber pixel. The illumination profile calibration can determine the exact location of the individual fibers, e.g. center locations of the pixels. Again this may use an all white image, or some other kind of image.

Fiber location may be carried out according to the flowchart of FIG. 4. This fiber location may be used either for calibration or simply for correction. When used for calibration, a calibration image which may have minimum structure, for example an image of all white, is obtained at 400. At 405, the calibration image is zoomed by a factor of 2, e.g. using a cubic convolution, to form a conditioned image. The zoomed image is then processed to determine peaks within the conditioned image. These peaks presumably represent locations of the fiber pixels. At 410, all the zoomed pixels are traversed. At each of the pixels, the current value is compared with neighboring pixels, where each neighbor is defined by nonzero elements of the fiber detection mask. A comparison is carried out at 420, and if the pixel value is equal to the neighbor, then it is marked as a peak at 425. Coordinates of the peak are stored in the fiber pixel memory indicating the position of the pixel. If the pixel value is not equal to the neighbor, then the next pixel is traversed. By zooming the image, these addresses can provide one-half of pixel accuracy relative to the original pixels. There could be multiple pixels in the neighborhood equal to the maximum. However, any of these can be taken as a peak.

In the current implementation, the data image is zoomed by a factor of Nz (all colors). This step can be eliminated by careful development of the Fiber Amplitude Mask and Cladding Amplitude Mask for the CCDx1 image since, $h*(g*I)=(h*g)*I.$ That is, if g is the 2D convolution kernel that zooms the image, it can be convolved (off-line) with any of the later operations, h, to produce an equivalent operation h*g, on the CCDx1 image. The 2D size, Nhg, of operator, h*g, can be accurately estimated from the 2D size of the h operator, Nh.

$$Nhg = \left(\frac{\sqrt{Nh}}{Nz} + 3\right)^2$$

This may be used to determine a fiber amplitude mask 221. It is known that both the core and clad of the fibers conduct light, but do so in different ways. These different ways may cause aliasing and other effects in the image. The position of the cladding amplitude, may also enable correction of these images. Hence a cladding amplitude mask 222 may also be formed.

In an alternative embodiment, in which the calibration is not used, then these peak points still represent the center locations of the pixels. The system may use the same technique of convolution in order to interpolate between the different peaks, thereby effectively interpolating for the spaces between the fibers and cores.

The fiber detection may as is effectively a match to the nominal fiber point spread function, and locates the fiber pixel locations. An exemplary fiber detection mask is shown in FIG. 3A. This mask may be used during calibration. The FIG. 3A mask is run over the calibration image to determine the locations of the fiber pixels. The fiber detection mask is therefore used for locating the individual pixels. Once located the fiber amplitude mask is weighting function that is used to calculate the fiber amplitude using the pixels that are in the neighborhood of any fiber pixel found using the fiber detection mask. A fiber amplitude mask may be shown in FIG. 3B. Effectively, this may integrate over the inner area of the fiber to determine the output of the fiber.

The cladding amplitude mask is a weighting function that is used to calculate cladding amplitude within the area determined by the fiber detection mask. Note that the cladding amplitude mask in FIG. 3C is effectively the opposite of the fiber amplitude mask. Therefore, the process of determining fibers and their values may be carried out by detecting the fiber location using the detection mask of FIG. 3A effectively a generic fiber detection mask, detect the amplitude of the fiber using the amplitude mask of FIG. 3B, and detect the amplitude of the cladding using the amplitude mask of FIG. 3C. Note again that the masks in FIGS. 3A–3C are for a specific shape of fiber. Different shaped fibers may be obtained from the fiber mask generation template 208. However, and this example, the fiber detection mask is a cosine function.

For this implementation, the fiber detection mask is cosine function $$\cos\left(\frac{\pi x}{p}\right), \quad -\frac{p}{2} < x < \frac{p}{2},$$

where p is the fiber pitch. The Fiber Amplitude mask is $$\begin{cases} 1, & |x| < 0.35p \\ 0, & \text{otherwise} \end{cases}$$

The Cladding Amplitude Mask is $$\begin{cases} 1, & 0,35p < |x| < 0.5p \\ 0, & \text{otherwise} \end{cases}$$

The calibration may also include estimating broken fibers. The broken fibers may be expected to be present within any scope. However, a determination of the broken fibers enables correcting for their locations.

After finally obtaining all of the desired calibration values, these values are then stored in a memory 242 within the video processing section 230. The array may effectively include an array indicating the locations of the different fibers, the gains of each of the different fibers, and desired corrections to the profile of a light beam.

The data images to be corrected our shown as 250, and are input to the video processing section 230. These images are then "fiber space transformed" effectively to process the images according to the way that the fiber receives the image and to compensate for it. At 232, a fiber-cladding amplitude variation is detected. This may be used for contrast enhancement. For example, an image may be processed by knowing where the centers of the fibers are, and where the clads are. Variations in the image may be based on the image itself, and also on the geometrical characteristics of the fibers.

232 represents enhancing contrast in fiber space based on the knowledge of the fiber itself.

234 is a block that corrects the profile.

User controls for zoom and contrast are shown as 236, and this may control image interpolation block 237 and image scaling block 238. The output image is provided at 244 for the display.

A refinement operation shown as 246, 247 may be carried out on the data images in order to update the stored information in memory 242. 246 may refine the fiber location according to the individual data image. 247 may be used to refine the actual profile. Therefore, the correction which is carried out may include parts that are from both the calibration and from the individual images.

Another advantage is obtained by selecting a small number of peaks in the center area of the citizens to color (black and white) image. A shift value is set. First, a trial shipped value is determined as have to size of the fiber detection mass. This is used to begin a two-dimensional shift position. For each two-dimensional shift, a match measure value is computed as the Ps., over the selecting peaks, of the correlation of the fiber detection mass with resumes its data at the calibrated peak location. The two-dimensional shift position that as the maximum match measure is then used. Each fiber location is adjusted by the selecting two-dimensional shift. This may refine location of the fibers. The profile may also be refine e.g. the illumination profile.

The fiber value calibration may be used to enhance contrast. For each of a plurality of colors and/or pixels, the fiber amplitude mask is used to compute the fiber value. The cladding amplitude mask is used to compute a black and white cladding value. Some fraction of the cladding value is then subtracted from the fiber value for the black and white amplitude. This difference is divided by the profile. This forms a ratio which may be used to correct for each fiber color value.

Image interpolation may also be carried out. The image interpolation may be dependent on the number of fiber pixels, and the number of output points (in either CCD space or display space). An advantage is that since the final image is effectively an interpolation from the fiber pixel elements, Digital Pan and zoom can be implemented without additional computation.

Figure 5A:
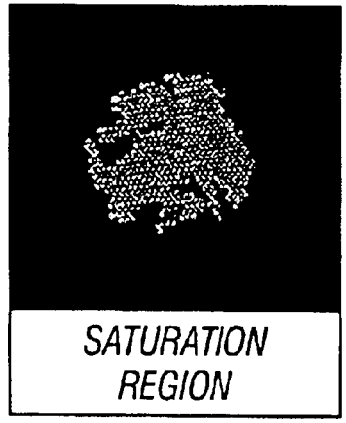
FIGS. 5a–5c show obtaining information from the clad to use to compensate for saturation.
Figure 5B:
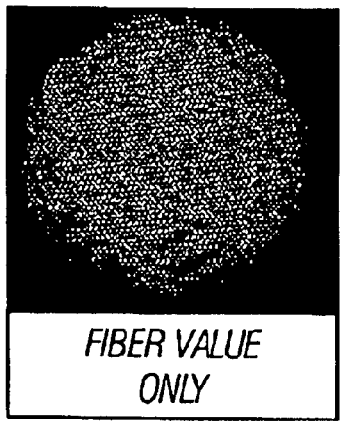
Figure 5C:
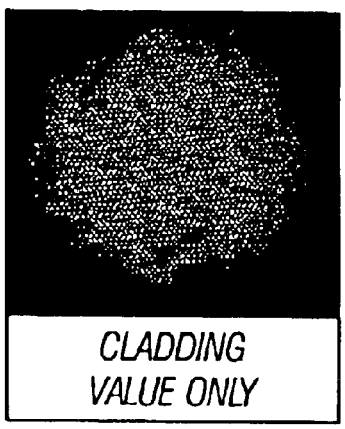

An additional aspect includes increasing the dynamic range using values from the cladding. In this embodiment, values from the fibers themselves, that is from the cores, that may be handled differently than values from the clads. It has been discovered by the present inventors that the values from the cladding are less effected by image saturation than values from the cores. Accordingly, the embodiment may use values from the cladding to enhance the image when the image from the cores is saturated. This is shown in FIGS. 5A–5C. FIG. 5A shows the saturation region where the pixel values are effectively saturated. FIG. 5B shows the fiber value only.

The value that is obtained from the cladding only is shown in FIG. 5C. This illustrates how values from the clad are less subject to saturation than values from the core. In this embodiment, saturation recovery can be achieved by using information from the clad. This may be done in many different ways. For example, if a frame is determined to be more than 20 or 30 percent saturated values, then in that case all of the values from the cores may be reduced by some amount, and weighted by the values from the clads.

As described above, this may establish fiber pixel locations as the brightest portions in the image. The brightness of each of those spots represents the amplitude for each fiber. Interpolation between those points then establishes the image information.

Another embodiment recognizes that in fiber space, each fiber space pixel represents the value that is transmitted from a fiber. In this embodiment, each fiber can be estimated as being a specified wave shape, e.g. a gaussian. Because the wave-shape is known, a saturated value can be estimated from the parts of the pixel value that are not saturated.

Figure 6A:
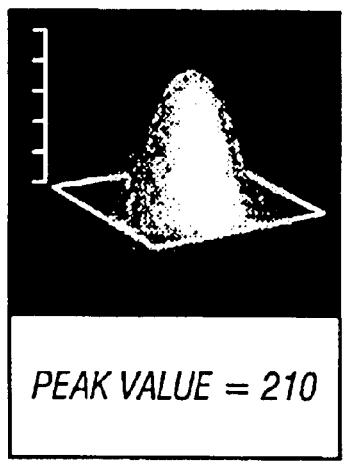
FIGS. 6a–6c show extrapolation of beam shape.
Figure 6B:
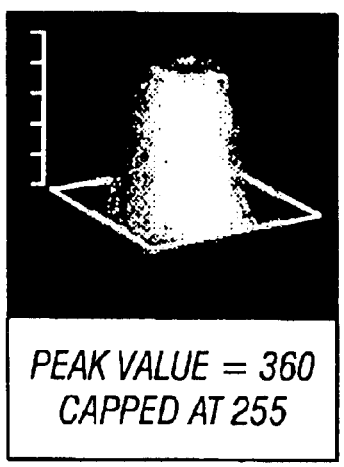
Figure 6C:
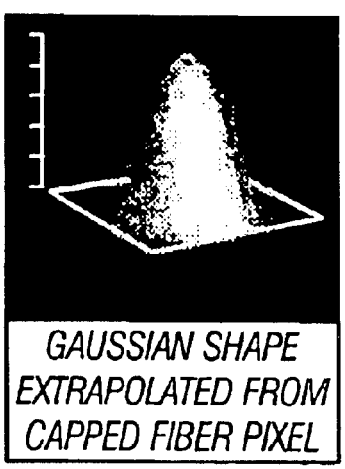

FIG. 6A shows a typical value shape, with a peak value of 210, and unsaturated value and shows the usual Gaussian shape of the pixel. Other shapes for pixels can also exist. FIG. 6B shows the wave shape for a pixel which is saturated. In this figure, the actual peak value should be 360, but instead the value is capped at 255 which represents the saturation value. Accordingly, based on the value of the actual pixel shape from FIG. 6A, the actual Gaussian is extrapolated from the capped peak value.

| Algorithm | Computational Dependencies | Number (millions) | | |
|---|---|---|---|---|
| | | Test 1 | Test 2 | Test 3 |
| Fiber Location Calibration | | | | |
| B&W Computation | 2*Ncx*Ncy | 0.35 | 0.35 | 0.51 |
| Correlation | 2*eNdm*Ncx*Ncy | 42.69 | 42.69 | 32.63 |
| Peak Fiber | 4*Nfp+ 4*eNdm*Ncx*Ncy | 85.39 | 85.39 | 65.30 |
| Illumination Profile Calibr | Nfp*(5+4*(9+ 2*Nfa+2*Nca)) | 3.15 | 3.15 | 15.54 |
| Total Calibration | | 131.58 | 131.58 | 113.99 |
| Black & White Computation | 2*Ncx*Ncy | 0.35 | 0.35 | 0.51 |
| Fiber Location Refinement | eNsh*eNsh*Nrf*(5+ 2*eNdm) | 1.04 | 1.04 | 2.24 |
| Profile Refinement | Not used currently | | | |
| Fiber Value Calculation | Nfp*(6+4*(9+ 2*eNfa)+(9+2*eNca)) | 2.20 | 2.20 | 4.29 |
| Profile Calculation | In the Fiber Value Calculation | 0.01 | 0.01 | 0.02 |
| Image Interpolation | 12*Nfp+ 2*(5*No)*(5*No) | 8.86 | 8.86 | 13.39 |
| Image Scaling | 2*3*No*No | 1.06 | 1.06 | 1.59 |
| Total Run Time/Frame | | 13.52 | 13.52 | 22.04 |

Figure 7:
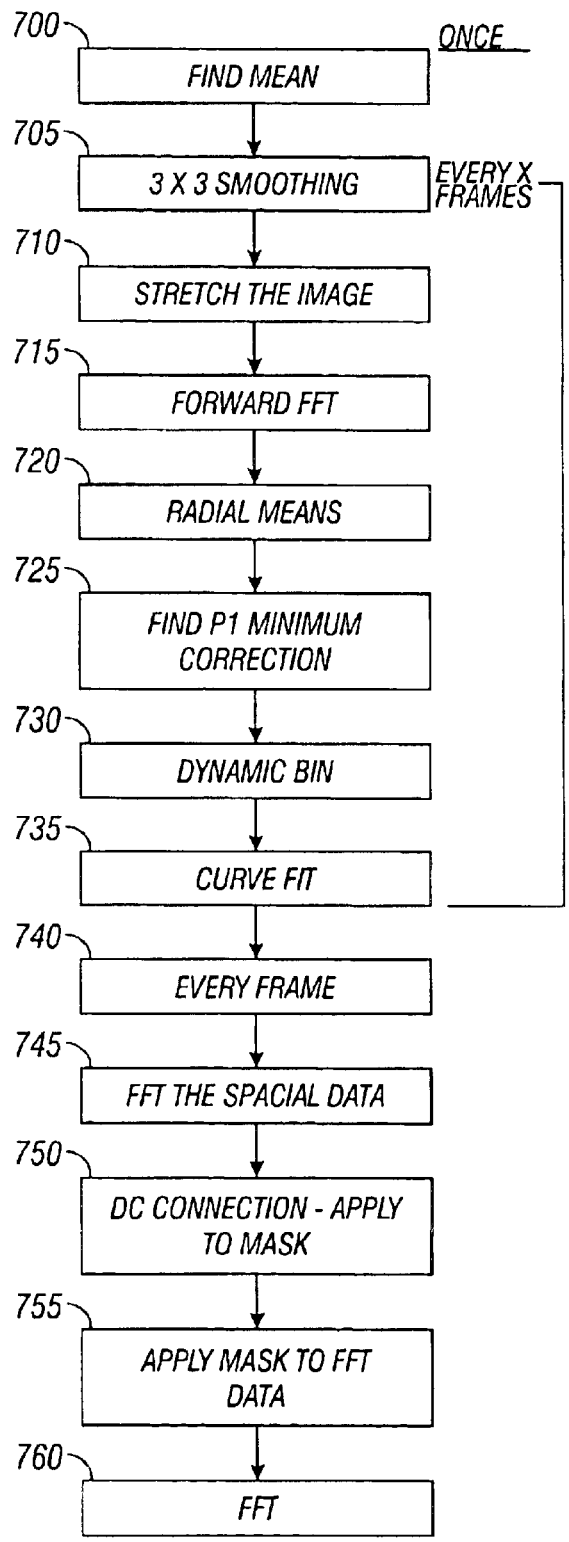
FIG. 7 shows a flowchart of local correction of the signal.

As part of the image filtering, a special fast Fourier transform or FFT image filtering process may be carried out at startup. The FFT calibration is shown in the flowchart of FIG. 7, and may be carried out by a processor, e.g.a DSP, within the image filter 134. At 700, an initial step is carried out at startup, of automatic image determination and matrix optimization. This allows smoothing of the image and searching for a threshold mean value in the image. The resultant matrix is used as a two's power in order to speed up the FFT process. Other processes may be carried out every x number of frames, for example, every 10 frames. 705 carries out a 3×3 smoothing. This may smooth the image using a first lightly weighed 3×3 smoother, and then a more heavily weighted 3×3 smoother. 710 stretches the resultant image both in size and in data depth. At 715, a forward FFT is carried out on each color. 720 carries out a radial average deviation, mean and dynamic binned mean. The binned mean is carried out by analyzing the data according to a circular pattern. Average deviation and mean are carried out using standard techniques and algorithms. The data is circularly connected using a spiral with a size that is about one-quarter of the radius. The data is binned and, and the bin that has the most data points is used for finding the mean values.

3×3 smoothing. This may smooth the image using a first lightly weighed 3×3 smoother, and then a more heavily weighted 3×3 smoother. 710 stretches the resultant image both in size and in data depth. At 715, a forward FFT is carried out on each color. 720 carries out a radial average deviation, mean and dynamic binned mean. The binned mean is carried out by analyzing the data according to a circular pattern. Average deviation and mean are carried out using standard techniques and algorithms. The data is circularly connected using a spiral with a size that is about one-quarter of the radius. The data is binned and, and the bin that has the most data points is used for finding the mean value.

725 carries out a windowed search to determine the cutoff point or P1 value. The window search starts at a radius of 10, and carries on in steps of 10. A value is established with the first point in the data set is something other than the max value. This is carried out on both the average deviation and mean data sets. These values are used as the new minimum of the data sets. The minimum values of each data set are then found, and a weighted mean is found using the last portion set to the weight. This mean value is used as the correction value P1.

A dynamic binned value may be found at 730. The dynamic binned value is processed by starting at each data point and comparing to the previous point. During an increase, it the value is larger, it is set to the value of the previous data point area. This insures that the data set decreases.

735 carries out a curve fit using a second order curve fitting technique.

740 begins the calibration that is carried out on each frame. At 745, the spatial data is FFTed. 750 represents determining a DC level and correction for the each frame. The DC level is applied to the mask. The mask is then applied to the frequency domain data obtained from the FFT at 755. An inverse FFT is carried out at 760. At this point, the image is stretched and reformatted.

A crucial issue in the image processing is correcting the images by compensating for the specific characteristics of the individual fiber pixels. These individual fiber pixel characteristics can be thought of as including fixed noise. In general, the process corrects for these problems by first calibrating to ascertain the characteristic values for each fiber pixel, and then using these calibrated values to correct each fiber image. The calibration can use, but is not limited to, gain of individual fibers, broken fibers, and saturation recovery. For example, the gain of individual fibers can be adjusted to compensate for their inaccuracies. If an individual fiber is weak or broken, then neighboring fibers can be used to estimate the value of that fiber.

The correction can also be applied using either a static or dynamic filtering process. The specific components of the individual fiber correction are described with reference to the block diagram of FIG. 8.

Figure 8:
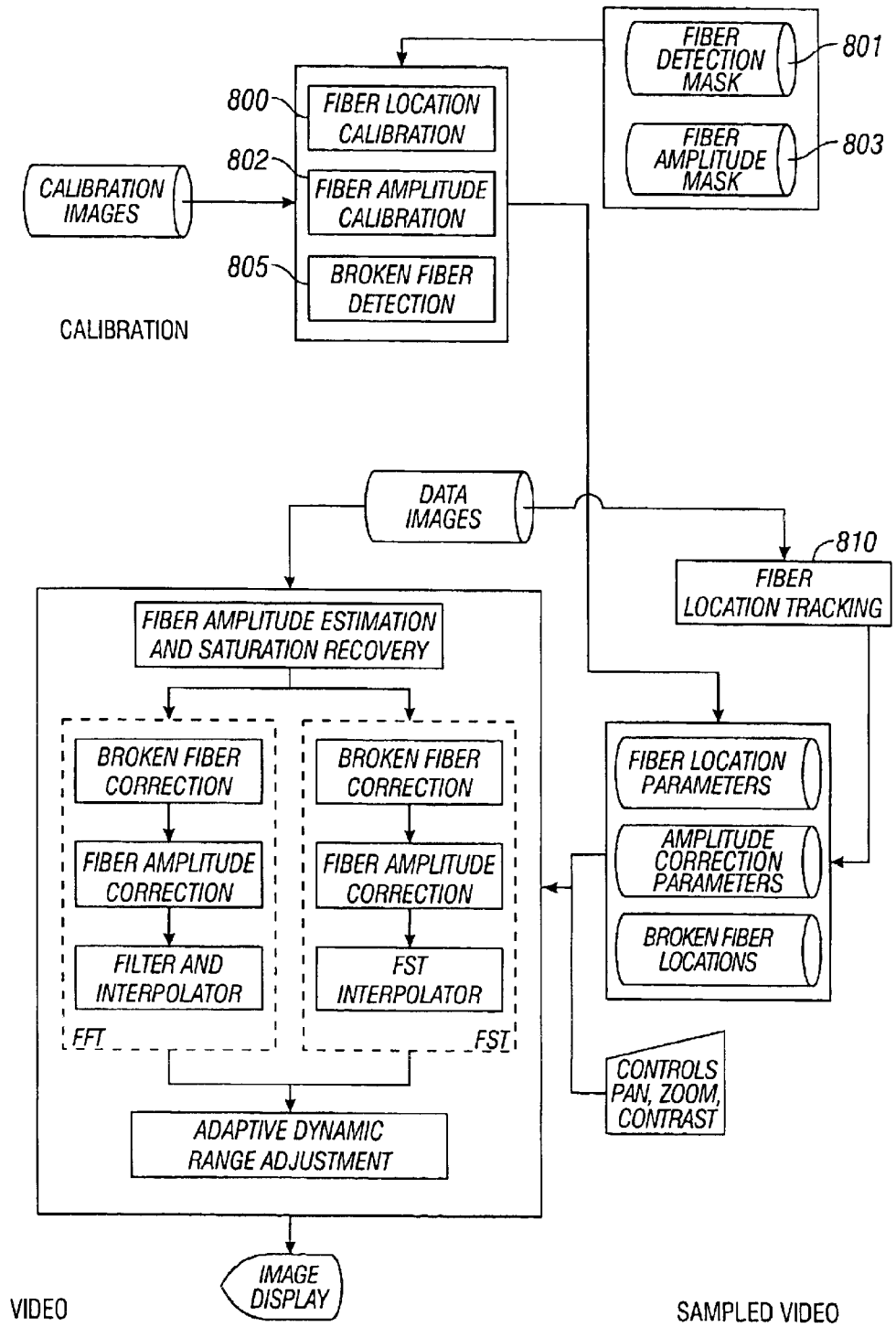
FIG. 8 shows a block diagram of fiber detection correction.

Initially, a fiber detection mask is found as described above. This fiber detection mask may be a computer file forming a mask which matches the nominal fiber point spread function. The values in the fiber detection mask represent the most likely fiber pixel locations. A fiber amplitude mask is also found as described above representing a weighting function of each of the fibers amplitude using the pixels in the neighborhood of any fiber pixel. FIG. 8 shows the initial calibration to determine the fiber detection mask or fiber location calibration 800, and fiber amplitude calibration 802. Broken fiber detection can also be carried out at 805. This forms the fiber mask 801 and amplitude mask 803.

The fiber location calibration uses a calibration image with minimum structure, for example a pure white image. The fiber amplitude calibration, in contrast, may use a collection of images that cover the expected range of pixel amplitudes. Each image may have a specified amplitude, and the resultant output produces a collection of images that represents a relationship between fiber value and intensity. The slope and offset for each fiber pixel can be calculated. Slope and offset for each fiber pixel is stored as part of the amplitude calibration and used to correct the image as described herein.

Broken fiber calibration at 805 is effectively a map of where broken fibers are located. If FFT is used for the broken fiber calibration, the system simply looks for the absence of a detected fiber. The FFT processing may also detect the broken fibers by detecting each pixel location. The fiber pixel nearest to the CCD pixel is found, and if the distance is greater than three-quarters of a fiber pitch, and the CCD pixel is marked as part of a broken fiber. Each broken fiber CCD pixel receives a set of available fiber pixels adjacent to the CCD pixel written in a table along with a weighted value to be used for later interpolation. The weighted value for each adjacent fiber pixel is taken as being inversely proportional to the distance. The sum of all weights add up to 1.

The techniques described herein require that each data image determines the exact location of each fiber pixel. Those locations are correlated with the corresponding locations on a calibration pixel. The calibration frame is assumed to have substantially exactly the same characteristics as each fiber frame. However, the received image may have a different offset and rotation value.

Use of the calibration information requires finding an offset and rotation that causes the data image pixels to exactly overlay a calibration pixel. FIGS. 9A–9C illustrate this operation. A single calibration image is shown in FIG. 9A. This image takes up the entire bundle of fiber pixels. The data image before offset and rotation is shown in FIG. 9B. Note the position of a notch in FIGS. 9A and 9B are different. Accordingly, the image is rotated to the position shown in FIG. 9C to line up the notch and the data image with the corresponding notch in the calibration and that allows the different values to overlay one another.

The techniques of overlaying the fiber pixel located image involve first describing the calibration image. The calibration image is described as follows.

$$\{(x,y_i), i=1, \ldots, n\}$$

and a set of fiber pixel locations for the data image described by:

$$\{(x_l, y_1) i=1, \ldots, n'\} \text{ where } n'(n$$

The offset and rotation problem can be described mathematically as the determination of three parameters $X_0$, $Y_0$ and $\Theta$ such that the following is true:

$$x_j(\bar{x}_j - x_0)\cos(\theta) + (\bar{y}_j - y_0)\sin(\theta)$$

$$y_j(\bar{y}_j - y_0)\cos(\theta) - (x_j - x_0)\sin(\theta)$$

For some subset and rotation of the calibration pixel locations $\{(\bar{x}_j, \bar{y}_j), j=1, \ldots, n'\}$. The parameters, $X_0$, $Y_0$ and $\theta$, can be determined using an efficient least-square fit method once the mapping from $(X_j, Y_j) \rightarrow (\bar{x}_j, \bar{y}_j)$ has been determined.

Figure 10:
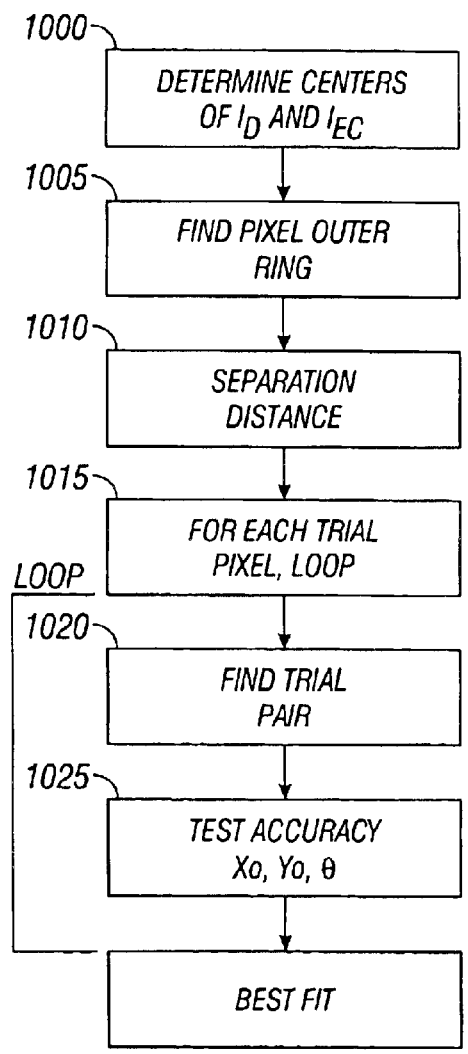
FIG. 10 shows a flowchart of the best fit operations.

The overlaying then is carried out using the technique shown in the flowchart of FIG. 10. At 1000, the technique determines an approximate center of the images, that is of both the data image ID and the calibration image IC. 1002 determines the outermost boundary by choosing a narrow ring of pixels as close as possible to the outer boundary. 1005 selects pixels from the data image ring on the outer boundary that are maximally separated, and records their separation distance at 1010. This is close to the outer diameter of the ring. For each pixel in the calibration image that could be included in a ring up the time, 1015 begins a log, all calibration pixels that could be paired based on the separation distance are found at 1020. It is noted that this should be only a few pixels. For each of these remaining pixels, at 1025, the parameters Xo, Yo and Θ are detected. The parameters are compared with the parameters and the calibration image to determine the desired offset and rotation.

While the above describes one way in which rotation could be carried out, another way could simply determine least mean squares at various locations in the images at a plurality of different rotation angles.

The broken fiber correction fails in the broken fiber areas by default using an average of the surrounding pixels. An analog method may simply use an average. However, FFT processing may use a more complicated technique.

After finishing the calibration, the amplitude of each fiber may also be corrected. For example, the slope and offset may be used to convert the measured fiber value into a normalized intensity value as follows.

CorrectedValue=m*MeasuredValue+b

The above has described specific processing techniques which are based on the specific characteristics of the image. Artifact removal may also be carried out to enhance the image. This artifact removal may not require initial calibration.

Another way in which the images can be process is by using FFT truncation. The image is can be cropped to a matrix size which is a power of $2^n$ 1100. An exemplary value may be 512. Each color in the matrix is then separately run through a two-dimensional FFT at 1105. A radial histogram is generated at 1110 and this histogram is determined to exclude peaks that are generated by fiber optics at 1115. A logical mask of similar dimensions to the image is generating with the valid data radius flag. The previously 2D FFT data is multiplied by the mask at 1125. These data sets are an inverse two-dimensional FFT and recombined into an RGB image at 1130.

Another artifact removal may be a "find circle" technique. This involves detecting borders of the endoscope image. Typically the endoscope image is a circle. Once the border is detected, it can be used for many things. The background may be forced to black, which can eliminate some visual noise. In addition, the center and radius of the endoscope circle can be determined, which can be useful for shading correction and other operations. In addition, later image processing steps may be focused on to just the area of the video image which has actual data. In other words, this can minimize the processing up the background, and hence minimize the amount of computation which needs to be done.

Another technique subtracts the black level in order to remove a fixed offset in image intensity that may be introduced by either the camera or the image processing parts of the camera such as the A/D converter. The parts of the CCD array within the camera that do not receive light, e.g. the background, should register as zero intensity. Often, however, they do not register as zero intensity, but rather can range between 2 and 5 percent of full range. This offset effectively decreases the dynamic range of the image. In this operation, the offset it can be detected by averaging a region of background and then subtracting the offset from all of the image pixels. This enables using the full range in later operations and specifically in histogram adjustments. In addition, this may simplify any multiplication which is carried out e.g. for shading correction or the light.

Shading and non-uniformity can also be corrected. This operation may correct issues where some parts of the image are always proportionately dimmer than other parts of the image. There may be many different reasons for this proportionality. An area may receive less illumination light than other areas. Non uniform shading is often caused by optical imperfections at the edges of the lens or even by dirt on the lens. Nonuniform illumination appears to be the most common cause of this nonuniform shading. In this environment, the intensity at the edges may be corrected by multiplying the edge pixels by a factor.

Figure 12:
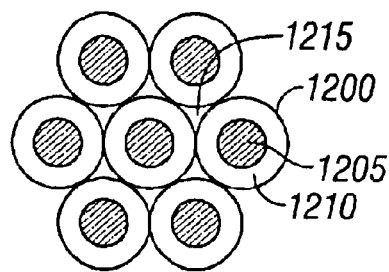
FIG. 12 shows an example diagram of a bundle of fiber.

The inventors have found that one major artifact from fiber scopes is caused by the borders between the fibers in the image in fiber space. The fiber-optic bundle may have between 20,000–50,000 fibers within the bundle. In operation, an image of this scene to be observed is projected onto the polished end of the fiber bundle. The bundle then carries the light from that distal location within the body to proximal objects that are coupled to the video camera. FIG. 12 illustrates the geometry of these fibers. Each fiber 1200 includes a core portion 1205 and a surrounding cladding 1210. Since the fibers have a round core, there are also spaces shown as 1215 between the fibers.

The cores carry most of the light, but the clads also carry some light parts. Each fiber core and clad combination acts as one pixel in forming the full fiber-optic image.

Figure 13A:
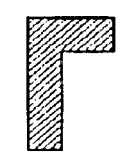
FIGS. 13a–13c show how an image can be distorted by a bundle of fibers.
Figure 13B:
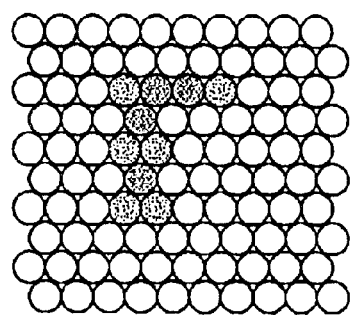
Figure 13C:
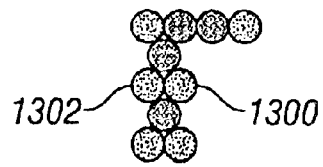

The concept of fiber space treats the continuous optical signal from the objective lens of the microscope as being sampled by the individual fibers. The sampling is less than ideal because of the spaces 1215 and the limited white transmittance of the clad. FIG. 13 shows how the effect of the fibers in fiber space effectively averages the light intensity over our region. The object shown in FIG. 13A is a continuous object. However, the image through the fiber bundle is shown in FIG. 13B. The actual image shown in FIG. 13C with the borders removed does not look that much like the original object. Therefore, the light intensity over the region is averaged in certain pixels such as 1300, 1302. There also may be dark gaps between the cores because of the honeycomb effect. The mesh removal may be carried out using one or more of the following techniques.

Image processing technique is based on well understood image processing methods. The image is converted from the analog domain into the frequency domain by a fast Fourier transform. The mesh is separated from the image information in the spatial frequency domain. In operation, first the full image is transformed into the frequency domain by a forward FFT. Frequency components representing the match, that is high frequencies, are simply set to zero. An inverse FFT is performed to reconstruct the image. This can remove many of the mesh parts.

The fiber space transform, described above, can also be used by identifying the location and intensity at each fiber pixel.

The fiber space transform stems from knowing the specific locations of each of the fibers, and figuring out from that location how to interpolate between the fiber pixels in order to create an image with any desired final resolution.

Another way to do this is by using a histogram adjustment. This may increase the dynamic range of the display, by ensuring that the full dynamic range is used. Assuming a display with 255 levels, the full range of intensity or luminance in the images is between 0 and 255. An actual image may occupy only a small part of this range. This may make it more difficult to see differences in brightness from one region to another. The present system may stretch intensities to allow them to cover the full range. This is done by forming all of the intensities onto a histogram and stretching the histograms.

Another technique which is related is adaptive dynamic range adjustment. This may achieve increased contrast while maintaining ColorSpace integrity. The maximum value in any ColorSpace may be measured. The dynamic range adjustment then may eliminate the amount of change allowed from one frame to the next as a moving average of frame maximums.

Another technique uses rank order filtering in order to eliminate or minimize the mesh within the incoming data. All of the pixels in a neighborhood may be taken and sorted from highest to lowest. A given rank among the pixels may be selected. This may work because the amplitude of the mesh is almost always lower than the amplitude of the fibers. A kernel can be constructed which has sufficient size to include some non mesh pixels. Within the neighborhood, maximum medium and minimum may be filter. The value of the center pixel may be compared to its neighborhood pixels, and rejected or altered into various from its neighborhood pixels by more than a certain amount.

Figure 14A:
FIGS. 14A and 14B show an image and masked image respectively.
Figure 14B:
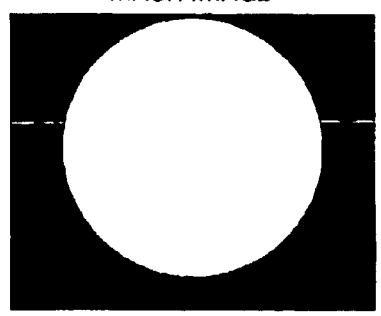

Background suppression may also be carried out as described above. The endoscopic image often does not fill the screen and has a black region around the image. FIG. 14 a shows the image from the endoscope. According to this, mask image shown in FIG. 14B may be formed. This mask image can be carried out as a logical bit wise "and" with each image. The mask can be found during calibration for example by taking numerous images in determining the median value of each pixel and range of each pixel. Up background pixel may be established in the median value is below a certain value (e.g. 5 percent of all, or, and it has a low standard deviation, and all its neighbors are also background pixels.

A profile correction can also be carried out. A profile correction establishes a specific profile for each scope. This defines the loss of light that occurs due to the scopes specific lensing system. One such loss of light is being yet in which is a function of curvature of the lens. Other examples may include local losses due to lens imperfections. Fiber bundle imperfections may also introduce a systematic light intensity problem.

Any camera system has interfaces between different parts of the camera system. The interfaces may collect service impurities. The service impurities can also be corrected based on a calibration image. Again, this should use a calibration image consisting of a white background with no image data. Several calibration images should be average in order to eliminate the fixed voice within the camera. The calibration images are processed using FFT or FST, and the reconstructed images used to determine the antenna value to bring each pixel to the same value. This additive value is then used to correct all the following images.

Many such systems are capable of rotation, and the rotation may also need to be corrected for as described above.

A steadily adapted filter may also be used based on the individual characteristics of the endoscope. Each fiber pixel may produce an output with a specified yet and amplitude. Rolloff may also be there. Each pixel may be curve it to the best function that represents the output of the pixel. That best it is then used for the kernel for that fiber pixel, and also indicates the immediately surrounding fiber pixel neighborhood.

Each of the fiber pixels may have the same convolution kernel, or a different convolution kernel. This technique may minimize the match for used for curve fitting. The frame to the process involves each pixel with its own convolution kernel to flag certain pixels as bad, certain weightings as systematic, and the like.

Another technique may use wavelet based mesh and noise removal. In this technique, the fiber scope image is mathematically decomposed into its multiple components. Noise and signal are separated, and the noise is removed. The wavelet transform may be used for this purpose. A wavelet with a basis function that is tailored to the image is used. Technical wavelet functions use generic signs and cosigned as into Fourier transform for their basis functions. Here, however, wavelets are created which match the shape of the fibers. The resolution up the decomposition is carried out on multiple levels. In this way, critical information in the lower spatial frequencies can be captured at high-resolution. High frequency noise is captured with coarser resolution. These wavelet transform properties make the decomposition more accurate and computationally efficient.

In addition, the mesh artifact in fiber scope is caused at least partially by gaps between the fibers. Since no light comes between these gaps, there is no information about the scenes at these gaps. The fibers perform a spatial sampling of the scene. This has the effect of decreasing the spatial resolution. Moreover, the information behind the cats can be recovered when the scope is moved slightly bringing different parts of the scene behind the cats within a few of fibers. Motion of the scope may be either induced or natural. Natural motion would use a frame to frame correlation to determine direction endings that of the motion between frames. The images are matched to derive a final high-resolution image. An actuator may also cause natural high frequency oscillations.

Although only a few embodiments have been disclosed in detail above, other modifications are possible. All such modifications are intended to be encompassed within the following claims, wherein:

What is claimed is:

1. A method, comprising:
   receiving an image through a fiber endoscope which includes a fiber bundle; and
   processing the image to determine pixels of the image at areas of individual fibers to compensate for characteristics of the fiber bundle and to exclude image artifacts generated by the fiber bundle, wherein said excluding artifacts comprises forming a two-dimensional FFT, and determining said artifacts from a histogram generated from the two-dimensional FFT.

2. A method as in claim 1, wherein said processing comprises processing the image to interpolate image characteristics into parts of the image which represent spaces between individual fibers of the fiber bundle.

3. A method as in claim 1, wherein said processing comprises determining locations within the image where individual fibers carried image information, and processing each individual fiber according to characteristics of the individual fibers.

4. A method as in claim 3, wherein said processing according to the characteristics of the individual fiber comprises using values from both the core and the clad of the individual fiber to establish a pixel value for the individual fiber.

5. A method as in claim 4, wherein said values from the clad are used to compensate for saturation in values from the core.

6. A method as in claim 4, wherein said compensating comprises forming a ratio between values from the core and values from the clad, and using said ratio for compensation.

7. A method as in claim 1, wherein said characteristics include compensating for a waveshape for each fiber of the bundle of fibers.

8. A method as in claim 7, wherein said waveshape is a Gaussian.

9. A method as in claim 7, further comprising using said waveshape to compensate for saturated parts of an image of each fiber.

10. A method as in claim 1, further comprising an initial operation of calibrating the fiber to determine characteristics of the individual fiber.

11. A method as in claim 10, wherein said calibrating comprises determining locations of individual fibers, and determining amplitudes of each of said individual fibers.

12. A method as in claim 11, wherein said calibrating also comprises determining locations of broken fibers.

13. A method as in claim 12, further comprising compensating for said locations of broken fibers.

14. A method as in claim 13, wherein said compensating comprises replacing a value in an area of said broken fiber with an average value of surrounding fibers.

15. A method as in claim 13, wherein said compensating comprises replacing an area of broken fiber with a normalized intensity value.

16. A method as in claim 1, wherein said processing further comprises determining a border of the endoscope image and processing only within the border of the endoscope image.

17. A method as in claim 16, further comprising finding a black level, and using said black level to determine an offset value.

18. A method, comprising:
receiving an image through a fiber endoscope which includes a fiber bundle; and
processing the image to determine pixels of the image at areas of individual fibers to compensate for characteristics of the fiber bundle, wherein said processing comprises determining frequency components of the image, determining components which are likely to represent components produced by a mesh of fiber pixels, and removing said components.

19. A method, comprising:
determining locations of pixels from fibers in an image from an endoscope;
processing said image from the endoscope to interpolate between values from said pixels, wherein said processing comprises determining frequency components of the image, determining components which are likely to represent components produced by a mesh of fiber pixels, and removing said components.

20. A method as in claim 19 further comprising calibrating by obtaining
calibration information representing a specific endoscope being used, and using the calibration information to correct the image.

21. A method as in claim 20, further comprising wherein said correcting comprises rotating to match the image information with the calibration information.

22. A method as in claim 19, wherein said processing comprises processing the image to interpolate image characteristics into parts of the image which represent spaces between individual fibers of the fiber bundle.

23. A method as in claim 19, wherein said processing comprises determining locations within the image where individual fibers carry image information, and processing each individual fiber according to characteristics of the individual fibers.

24. A method, comprising:
receiving a received image from a fiber endoscope;
processing said received image to determine areas of said received image which are caused by gaps between fibers in the endoscope; and
processing said received image to compensate for said gaps and to create a processed image that has image information in areas of said gaps, wherein said processing comprises determining frequency components of the image, determining components which are likely to represent components produced by a mesh of fiber pixels, and removing said components.

25. A method as in claim 24, wherein said processing comprises processing based on analysis of components of the received image.

26. A method as in claim 24, wherein said processing comprises processing based on analysis of individual characteristics of the endoscope.

27. A method as in claim 26, further comprising calibrating to determine information about said individual characteristics.

28. A method as in claim 24, wherein said processing to find gaps comprises a convolution between image parts and a convolution indicative of said gaps.

29. A method, comprising:
obtaining an image that was received over a fiber endoscope;
separating said image into a plurality of points at specified locations, which plurality of points respectively represent locations of individual fibers within the fiber endoscope; and
interpolating between said points to produce a processed image wherein said interpolating comprises Fourier transforming the image, and interpolating the Fourier transformed image.

30. A method as in claim 29, wherein said interpolating comprises convolving kernels of the image to interpolate between said points.

31. A method as in claim 29, wherein said interpolating comprises determining parts of the image which represent artifacts left by a fiber bundle mesh, and removing said parts.

32. A method as in claim 29, further comprising interpolating to compensate for broken fibers in the endoscope bundle.

33. A method as in claim 29, further comprising determining parts of the image which represent likely information from the fiber optic cores, and parts of the information which represent likely information from the fiber clads, and using fiber clad information to correct image information from the fiber cores.

34. An apparatus, comprising:
an image receiving part, receiving an image from a fiber endoscope which includes a fiber bundle; and
a processor that processes the image to determine pixels of the image at areas of individual fiber to compensate for characteristics of the fiber bundle, wherein said processor operates to determine frequency components of the image, determine components which are likely to represent components produced by a mesh of fiber pixels, and remove said components.

35. An apparatus as in claim 34, wherein said processor processes the image to interpolate image characteristics into parts of the image which represent spaces between individual fibers of the fiber bundle.

36. An apparatus as in claim 35, further comprising a fiber endoscope with a fiber bundle.

37. An apparatus as in claim 35, wherein said processor locations within the image where individual fibers carried image information, and processes each individual fiber according to characteristics of the individual fibers.

38. An apparatus as in claim 34, further comprising a memory, storing a histogram which is used to correct said image.

39. An endoscope assembly comprising:
an endoscope, having a bundle of individual fibers, said endoscope producing image information, and
an image processor, processing said image from the endoscope to interpolate between values from said individual fibers, wherein said image processor operates to exclude image artifacts generated by the fiber bundle wherein said excluding artifacts comprises forming a two-dimensional FFT, and to determine said artifacts from a histogram generated from the two-dimensional FFT.

40. An assembly as in claim 39, further comprising a memory, storing calibration information about a specific endoscope being used to receive said image.

* * * * *